United States Patent
Wick et al.

(10) Patent No.: US 6,992,124 B2
(45) Date of Patent: *Jan. 31, 2006

(54) POLYOLEFIN MOLDING COMPOUND FOR PRODUCING CALENDERED FILMS/SHEETS

(75) Inventors: Christian Wick, Meitingen; Gerhard Pfahler; Alexander Lichtblau, both of Augsburg, all of (DE)

(73) Assignee: Clariant GmbH, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,226

(22) Filed: Feb. 3, 1999

(65) Prior Publication Data

US 2002/0006992 A1 Jan. 17, 2002

(30) Foreign Application Priority Data

Feb. 7, 1998 (DE) .......................... 198 04 910

(51) Int. Cl.
 *C08K 5/3495* (2006.01)
 *C08K 5/34* (2006.01)
 *C08K 5/15* (2006.01)

(52) U.S. Cl. .......................... 524/100; 524/94; 524/95; 524/102; 524/111; 524/120; 524/126; 524/153; 524/302; 524/303; 524/305

(58) Field of Classification Search .................. 524/94, 524/95, 100, 102, 111, 120, 126, 153, 302, 524/303, 305, 394
See application file for complete search history.

(56) References Cited

U.S. PATENT DOCUMENTS 3,742,096 A   6/1973   Spivack
4,767,667 A   8/1988   Schneider et al. .......... 428/336
4,829,112 A * 5/1989   Ishii et al. ................... 524/108
4,892,605 A   1/1990   Schneider et al. ....... 156/272.6
4,985,480 A   1/1991   Fukui et al.
5,086,099 A   2/1992   Fukui et al.
5,086,100 A   2/1992   Fukui et al.
5,246,777 A   9/1993   Ishii et al.
5,250,593 A  10/1993   Ishii et al.
5,338,780 A   8/1994   Kojima et al.
5,455,289 A * 10/1995   Caselli ....................... 523/223
5,719,217 A   2/1998   Gugumus
5,846,656 A  12/1998   Dunski
6,015,849 A * 1/2000   Gugumus ................... 524/100

FOREIGN PATENT DOCUMENTS

| | | |
|---|---|---|
| DE | 2823507 | 12/1979 |
| DE | 3628322 | 2/1987 |
| DE | 4028407 | 3/1992 |
| DE | 195 37 140 | 4/1996 |
| EP | 0 565 184 | 10/1993 |
| EP | 0607783 | 7/1994 |
| GB | 2 293 827 | 4/1996 |
| WO | WO 98/51690 | 11/1998 |

* cited by examiner

*Primary Examiner*—Kriellion A. Sanders
(74) *Attorney, Agent, or Firm*—Susan S. Jackson; Scott E. Hanf

(57) ABSTRACT

The present invention relates to a synergistic additives mixture for producing calendered polyolefin articles, comprising A) at least one component from the group of peroxide-destroying phosphorus or sulfur compounds, B) at least one component from the group of phenolic antioxidants, C) at least one component from the group of sterically hindered amines, and D) if desired, further additives. Using this additive mixture prevents sticking to the hot roll surfaces and reduces the degradation of the polymer.

9 Claims, No Drawings

POLYOLEFIN MOLDING COMPOUND FOR PRODUCING CALENDERED FILMS/SHEETS

BACKGROUND OF THE INVENTION

It has been known for a long time that the technique of calendering can be used to process PVC mixtures in particular, both plasticized and unplasticized, to give technically high-grade webs of film. A particular difficulty with this technique in the case of polyolefins is to overcome the tendency of the hot polymer melt to stick to the metal surfaces of the calender rolls. With this aim in mind, numerous formulations have been developed in which these sticking characteristics are controlled by adding suitable lubricants and release agents. DE-A-3628322, for example, proposes mixtures of various polyolefins, especially low-pressure polyethylene, PVA (polyvinyl acetate), EVA (ethylene-vinyl acetate) and/or EAA (ethylacrylic acid), in order to increase the processing stability. To solve the processing problem EP-A-0607783 describes mixtures of HDPE having a very low MFR (melt flow index) and linear LDPE (low density) together with a mineral filler.

The tendency of the polymer melt to stick to the hot metal surfaces of the processing machines can also be reduced by utilizing the lubricant effect of surface-active substances, as are employed, for example, as antistatic agents for PVC mixtures. As described in DE-A-2823507, metal sulfonates can be used as release agents for reducing the sticking tendency.

Plasticated polymer compositions which can be processed to webs of film on calendering units are generally required to have a broad softening range and a sufficiently high viscosity at the prevailing processing temperatures and under the prevailing shear conditions.

The high melt viscosities required are possessed by PVC mixtures. High polymers such as polypropylene and polyethylene, however, possess low melt viscosities. Whereas the melt consistency of a PVC molding compound remains relatively unchanged up to the point where the material sticks fast to the rolls and beyond that to the point where the ultimate stability is reached, the viscosity of a polypropylene molding compound undergoes a very sharp decrease until the tack-free time is reached, and especially if the experiment is pursued further, and so considerably hinders processing on calendering units.

For technological and economic reasons (for example, the use of a material of relatively low density or comprising an apolar plastic) there has long been a desire to produce such calendered films on the basis not only of PVC but also of polyolefins, such as homopolymers and copolymers of ethylene or of propylene. Hitherto this was difficult because commercial polyolefin compositions, on calendering, stick fast to the metal rolls after just a very short running time and become very liquid, resulting in films having entirely inadequate physical properties or even in the dripping of the polymer compound from the calender rolls.

Nor did application of the technique common in the calendering of PVC, namely the addition of lubricants whose polarity is adapted to that of the plastic, lead to the desired result for polyolefins. In order to achieve improved processing stability, DE-A-4028407 describes the use of stabilizers; mixtures of phosphites or thio costabilizers and phenols permit somewhat easier processing of the polyolefin molding compound.

SUMMARY OF THE INVENTION

It has now surprisingly been found that the disadvantages depicted can be avoided and that the processing stability described in DE-A-4028407 can be considerably improved if the production of films by calendering polyolefins is conducted using molding compounds to which specific chemicals already known as stabilizers are added.

The invention relates to a polyolefin molding compound for producing calendered films/sheets which sticks to the hot metal surfaces of the processing machines to an extremely small extent and does not drip off the hot rolls during processing.

The invention therefore provides a synergistic additives mixture for producing calendered polyolefin articles, comprising A) at least one component from the group of peroxide-destroying phosphorus or sulfur compounds, B) at least one component from the group of phenolic antioxidants, C) at least one component from the group of sterically hindered amines, and D) if desired, further additives.

DESCRIPTION OF THE PREFERRED EMBODIMENTS

A particularly suitable additives mixture is one comprising

A) at least one component from the group of peroxide-destroying phosphorus or sulfur compounds of the formulae (1) to (5)

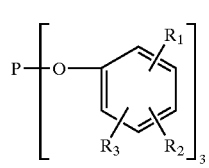

(1)

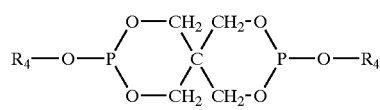

(2)

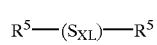

(3)

$R^5\text{—}(S_{XL})\text{—}R^5$

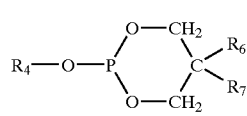

(4)

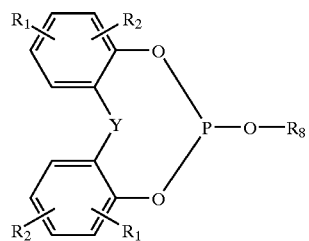

(5)

in which $R^1$, $R^2$ and $R^3$ are identical or different and are a hydrogen atom, a methyl group, a t-butyl group, a 1,1-dimethylpropyl group or a cyclohexyl group or are a phenyl radical which is unsubstituted or substituted by $R^1$ to $R^3$ as defined above but excluding a further phenyl radical, $R^4$ is a $C_8$–$C_{22}$-alkyl group or a radical of the formula (6)

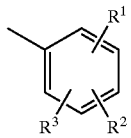
(6)

in which $R^1$ to $R^3$ are as defined above or can be 2-phenyl-2,2-dimethylethyl groups, $R^5$ is a $C_8$–$C_{20}$-alkyl group and x is an integer from 1 to 5, or $R^5$ can be $C_8$–$C_{20}$—O(O)C—$CH_2$—$CH_2$—, $R^6$ and $R^7$ can be identical or different and can be a hydrogen atom, a methyl group, an ethyl group, a n-butyl group, a t-butyl group or a propyl group, $R^8$ can be a halogen atom, a branched or unbranched $C_1$–$C_{10}$-alkyl group, or a trivalent group of the formula

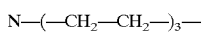

in which each valence is occupied by formula (5) to give the structure N—[$CH_2$—$CH_2$—O—P-radical of formula (5)]$_3$;

is a direct bond, a methylene group or an alkyl-substituted alkylene bridge having a total of 4 carbon atoms;

a compound of the formula (7)

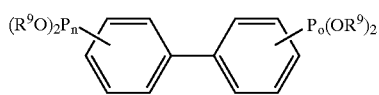
(7)

where the sum of n and o can be 1 or 2 and $R^9$ is a radical of the formula (6), and B) at least one component from the group of phenolic antioxidants consisting of 3,3-bis(3'-tert-butyl-4'-hydroxyphenyl)butyric glycol ester, tetrakismethylene (3,5-di-tert-butyl-4-hydroxycinnamato)methane, octadecyl 3,5-di-tert-butyl-4-hydroxycinnamate, 1,3,5-trimethyl-2,4,6-tris(3,5-di-tert-butyl-4-hydroxybenzyl) benzene, 1,3,5-tris(3,5-di-tert-butyl-4-hydroxybenzyl) isocyanurate, 2,4,6-tris(3,5-di-tert-butyl-4-hydroxybenzyl)isocyanurate, 1,1,3-tris(2'-methyl-4'-hydroxy-5'-tert-butylphenyl)butane, 3,9-bis[1,1-dimethyl-2-(di-tert-butyl-4-hydroxy-5-methylphenyl) propionyloxy)ethyl]-2,4,8,10-tetraoxospiro[5.5] undecane, α-tocopherol including its isomer mixture and of the formula (8)

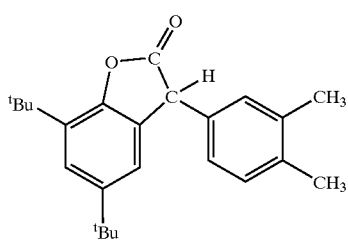
(8)

and

C) at least one component from the group of the sterically hindered amines which are named or whose formulae are set out below, consisting of the compound (9)

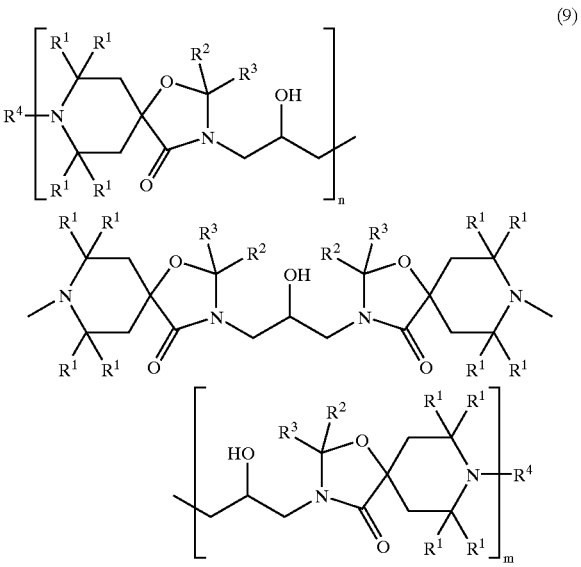
(9)

in which n and m independently of one another are a number from 0 to 100, where n and m cannot simultaneously be 0, $R^1$ is hydrogen or a $C_1$–$C_{12}$-alkyl group, $R^2$ and $R^3$, independently of one another are a hydrogen atom or a $C_1$–$C_{18}$-alkyl group or, together with the carbon atom connecting them, are a ring of ring size 5 to 13 or, together with the carbon atom linking them, are a group of the formula (10)

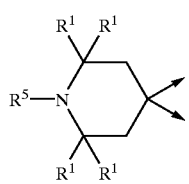
(10)

where $R^4$ in formula (5) and $R^5$ in formula (10) independently of one another are either hydrogen or a $C_1$–$C_{22}$-alkyl group, an oxygen radical O*, —OH, —NO, —$CH_2$CN, benzyl, allyl, a $C_1$–$C_{30}$-alkyloxy group, a $C_5$–$C_{12}$-cycloalkyloxy group, or a $C_6$–$C_{10}$-aryloxy group, where the aryl radical can additionally also be substituted; a $C_7$–$C_{20}$-arylalkyloxy group where the aryl radical can additionally also be substituted, a $C_3$–$C_{10}$-alkenyl group, a $C_3$–$C_6$-alkynyl group, a $C_1$–$C_{10}$-acyl group, halogen, or $C_7$–$C_9$-phenylalkyl which is unsubstituted or substituted on the phenyl ring by $C_1$–$C_4$-alkyl;

the compound (11)

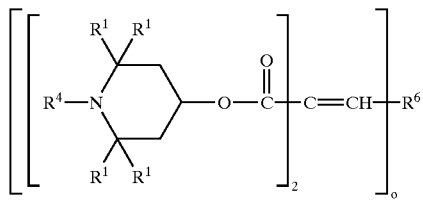
(11)

in which $R^1$ and $R^4$ are as defined for formula (9),
$R^6$ is an unsubstituted or substituted aromatic radical and
o is 1 or 2;

the compound (12)

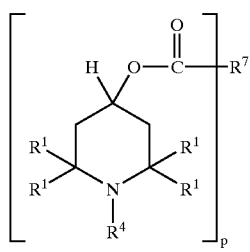
(12)

in which $R^1$ and $R^4$ are as defined for formula (9),
$R^7$ is $C_1$–$C_{18}$-alkylene, $C_2$–$C_{18}$-oxaalkylene, $C_2$–$C_{18}$-thiaalkylene, $C_2$–$C_{18}$-azaalkylene or $C_2$–$C_8$-alkenylene; a $C_1$–$C_{18}$ n-valent aliphatic radical; $R^3$ as $C_1$–$C_{18}$-alkylene is branched or especially straight-chain alkylene, p is the numbers 1 to 10;

the compounds
5,11-bis(2,2,6,6-tetramethyl-4-piperidinyl)-3,5,7,9,11,13-hexaaza-tetracyclo[7.4.0.0$^{2,7}$.1$^{3,13}$]tetradecane-8,14-dione; 2,2,4,4-tetramethyl-20-(oxiranylmethyl)-7-oxa-3,20-diazadispiro[5.1.11.2]heneicosan-21-one; 2,2,4,4-tetramethyl-7-oxa-21-oxo-3,20-diazadispiro[5.1.11.2]heneicosane-3-propanoic acid dodecyl ester and 2,2,4,4-tetramethyl-7-oxa-21-oxo-3,20-diazadispiro[5.1.11.2]heneicosane-3-propanoic acid tetradecyl ester;

at least one component of the formulae (13) and (14)

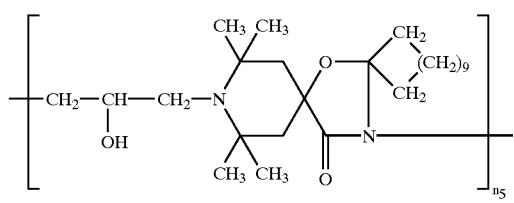
(13)

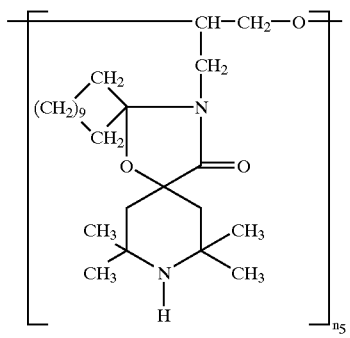
(14)

in which $n_5$ independently is an integer from 2–30;
the reaction product U1 of epichlorohydrin and 2,2,4,4-tetramethyl-20-(oxiranylmethyl)-7-oxa-3,20-diazadispiro[5.1.11.2]heneicosan-21-one;
a mixture M comprising the above-described compound (9) in a proportion of 60–95% by weight, the compound (15) in a proportion of 4–30% by weight and the compound (16) in a proportion of 1–10% by weight

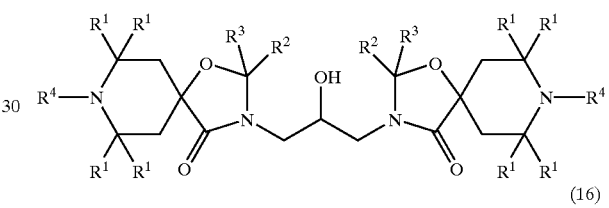
(15)

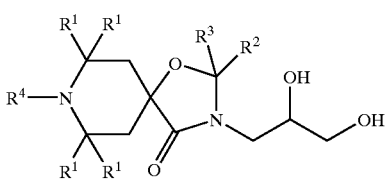
(16)

in which the substituents are as defined for compound (9), a compound U2 which represents a condensation product of 1-hydroxyethyl-2,2,6,6-tetramethyl4-hydroxypiperidine and succinic acid;
a product U3 obtainable by reacting a reaction product of a polyamine of the formula U3a and cyanuric chloride with a compound of the formula U3b,

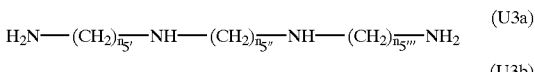
(U3a)

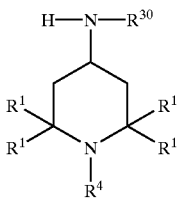
(U3b)

where
$R^1$ and $R^4$ are as defined for formula (9),
$n_{5'}$, $n_{5''}$ and $n_{5'''}$ independently of one another are a number from 2 to 12, $R^{30}$ is hydrogen, $C_1$–$C_{12}$-alkyl, $C_5$–$C_{12}$-cycloalkyl, phenyl or $C_7$–$C_9$-phenylalkyl; where U3 is a compound of the formula U3-1, U3-2, U3-3
(U3-1)
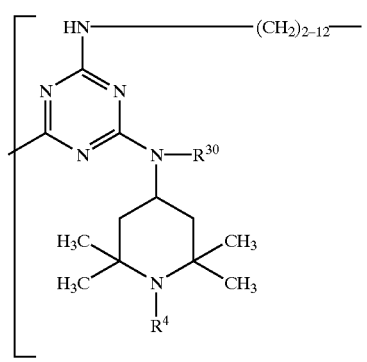
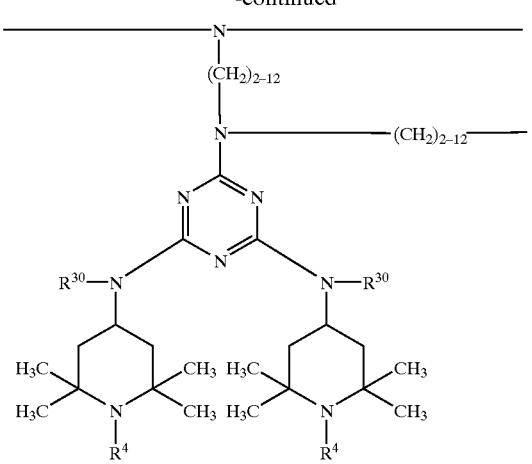
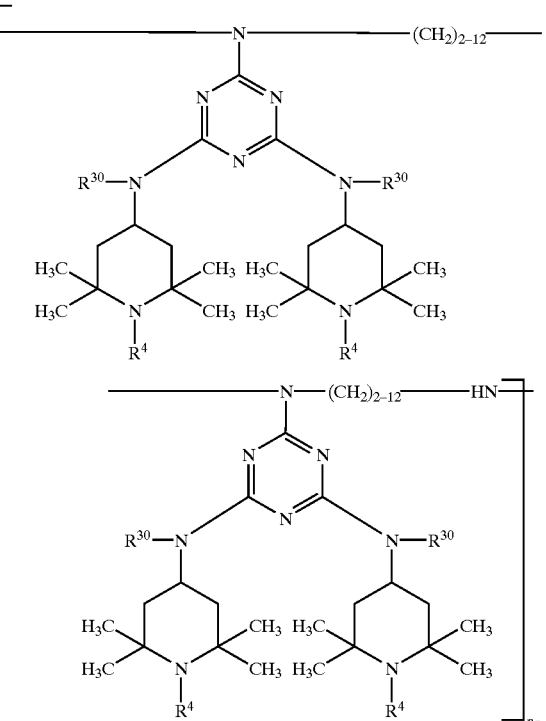
(U3-2)
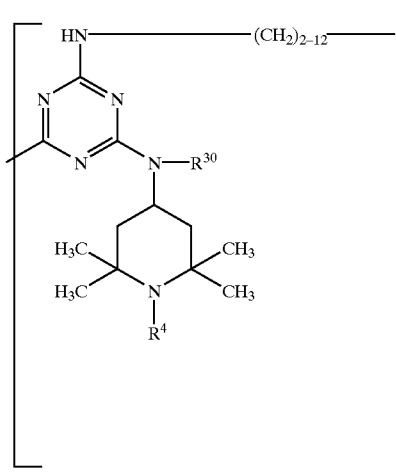
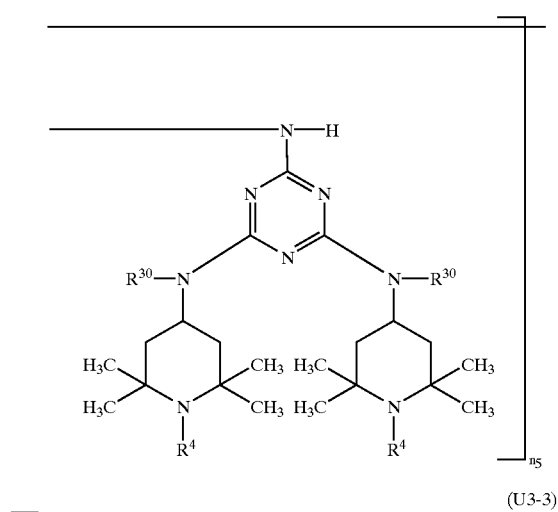
(U3-3)

-continued

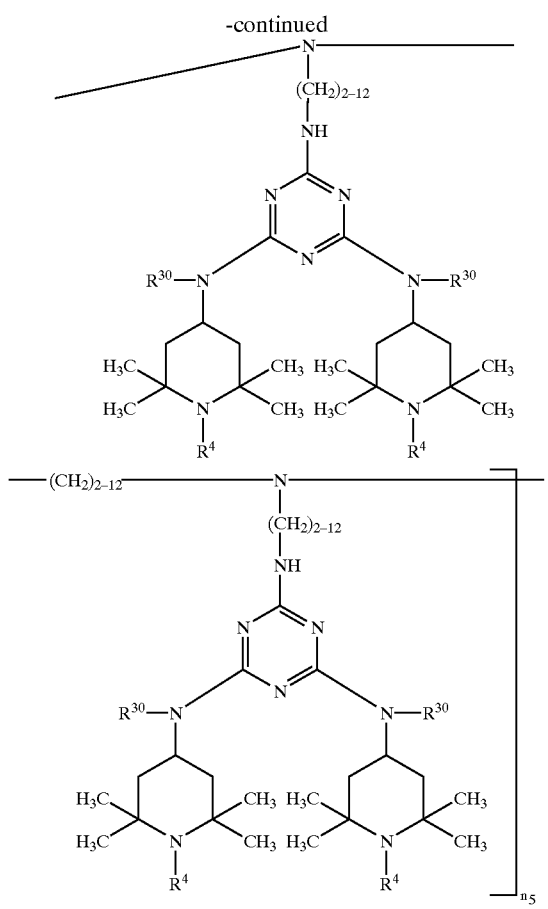

or a mixture thereof, in which $n_5$ is from 2 to 0, $R^4$ and $R^{30}$ are as defined for compound (9) or, respectively, for compound U3b;

a compound (17)

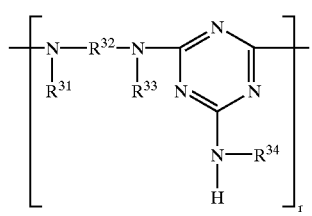
(17)

where r is a number from 2 to 50, $R^{31}$, $R^{33}$ and $R^{34}$ independently of one another are hydrogen, $C_1$–$C_{12}$-alkyl, $C_5$–$C_{12}$-cycloalkyl, $C_1$–$C_4$-alkyl-substituted $C_5$–$C_{12}$-cycloalkyl, phenyl, —OH— and/or $C_1$–$C_{10}$-alkyl-substituted phenyl, $C_7$–$C_9$-phenylalkyl, $C_7$–$C_9$-phenylalkyl which is substituted on the phenyl radical by —OH and/or $C_1$–$C_{10}$-alkyl, or are a group of the formula 17a,

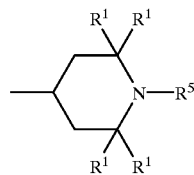
(17a)

where $R^1$ and $R^5$ are as defined in compound (9) or, respectively, compound (10) and $R^{31}$ and $R^{33}$ additionally and independently of one another are hydrogen, $R^{32}$ is $C_2$–$C_{18}$-alkylene, $C_5$–$C_7$-cycloalkylene or $C_1$–$C_4$-alkylenedi($C_5$–$C_7$-cycloalkylene) or the radicals $R^{31}$, $R^{32}$ and $R^{33}$, together with the nitrogen atoms to which they are attached, form a 5- to 10-membered heterocyclic ring, and where at least one of the radicals $R^{31}$, $R^{33}$ and $R^{34}$ is a group of the formula 17a;

a compound (18)

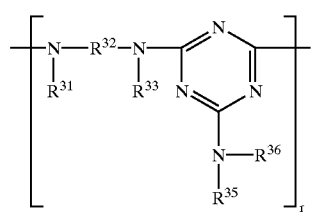
(18)

in which $R^{31}$, $R^{32}$, $R^{33}$ and r are as defined above, $R^{35}$ and $R^{36}$ independently of one another can have the definition of $R^{34}$, or $R^{35}$ and $R^{36}$, together with the nitrogen atom to which they are attached, form a 5- to 10-membered heterocyclic ring which in addition to the nitrogen heteroatom may also include one or more heteroatoms, preferably an oxygen atom, and at least one of the radicals $R^{31}$, $R^{33}$, $R^{35}$ and/or $R^{36}$ is a group of the formula (17a);

a compound (19)

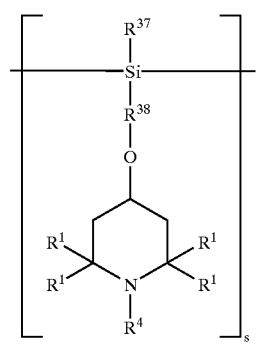
(19)

where $R^1$ and $R^4$ are as defined for compound (9) and s is a number from 1 to 50, $R^{37}$ is $C_1$–$C_{10}$-alkyl, $C_5$–$C_{12}$-cycloalkyl, $C_1$–$C_4$-alkyl-substituted $C_5$–$C_{12}$-cycloalkyl, phenyl or $C_1$–$C_{10}$-alkyl-substituted phenyl, $R^{38}$ is $C_3$–$C_{10}$-alkylene;

a product U4 obtainable by reacting a polyamine of the above-described formula U3a with formula U4a

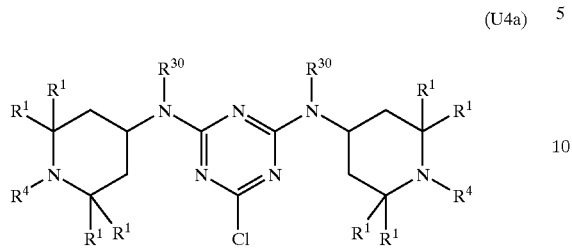
(U4a)

where the radicals $R^1$, $R^4$ and $R^{30}$ are as defined for compound (9) or, respectively, compound U3b; and D) comprising as further additive a stearate Z of an alkaline earth metal.

Particular preference is given to additives mixtures comprising

A) at least one of the following compounds:

tris(2,4-di-tert-butylphenyl)phosphite, distearyl pentaerythritol diphosphite, bis(2,4-di-tert-butylphenyl) pentaerythritol diphosphite, 1,3,2-dioxaphosphorinan-5-butyl-5-ethyl-2-[2,4,6-tri-tert-butylphenoxy], 2,2',2"-nitrilo[triethyl tris(3,3',5,5'-tetra-tert-butyl-1,1'-biphenyl-2,2'-diyl)phosphite], tetrakis(2,4-di-tert-butyl)-4,4'-diphenylidene diphosphite, and its positional isomers or a mixture thereof, and bis(2,4-dicumylphenyl)pentaerythritol diphosphite;

B) at least one of the following compounds:

3,3-bis(3'-tert-butyl-4'-hydroxyphenyl)butyric acid glycol ester, tetrakismethylene(3,5-di-tert-butyl-4-hydroxycinnamato)methane, octadecyl 3,5-di-tert-butyl-4-hydroxycinnamate, α-tocopherol and the mixture of its isomers, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,4,6-tris(3,5-di-tert-butyl-4-hydroxybenzyl)isocyanurate or an above-described compound of the formula (8);

C) at least one of the following compounds:

the above-described mixture M, 2,2,4,4-tetramethyl-20-(oxiranylmethyl)-7-oxa-3,20-diazadispiro[5.1.11.2]heneicosan-21-one, 2,2,4,4-tetramethyl-7-oxa-21-oxo-3,20-diazadispiro[5.1.11.2]-heneicosane-3-propanoic acid dodecyl ester and 2,2,4,4-tetramethyl-7-oxa-21-oxo-3,20-diazadispiro[5.1.11.2]-heneicosane-3-propanoic acid tetradecyl ester, bis(2,2,6,6-tetramethylpiperidin-4-yl)sebacate, [(4-methoxyphenyl)methylene]propanedioic acid bis(2,2,6,6-tetramethyl-4-piperidinyl)ester, bis(1-octyloxy-2,2,6,6-tetramethylpiperidyl)sebacate, N,N'-diformyl-N,N'-bis(2,2,6,6-tetramethyl-4-piperidinyl)hexamethylenediamine, the above-described reaction product U1 of epichlorohydrin, the above-described compounds of the formulae (9), (13) and (14), a compound (19)

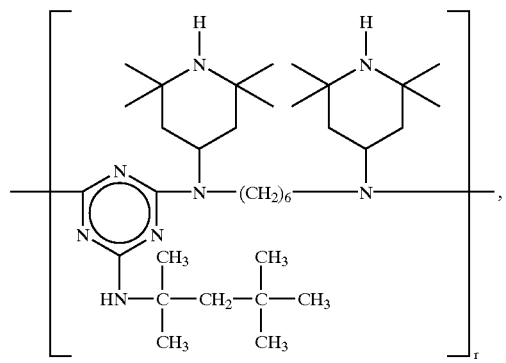
(19)

the reaction products $U_x$ of 2-chloro-4,6-di(4-n-butylamino-1,2,2,6,6-pentamethylpiperidyl)-1,3,5-triazine with monovalent or polyvalent amines, where between one and all active hydrogen atoms on the amine are replaced, such as with ethylenediamine, diethylenetriamine, triethylenetetramine, hexamethylenediamine, 1,2-bis(3-aminopropylamino) ethane, the compounds of the formulae (20) to (23)

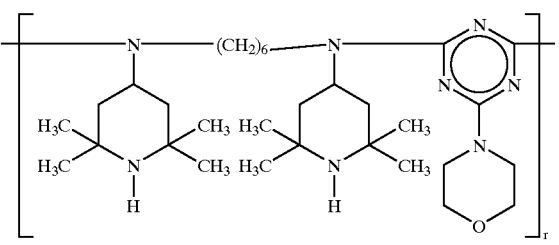
(20)

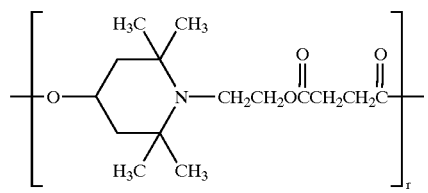
(21)

-continued

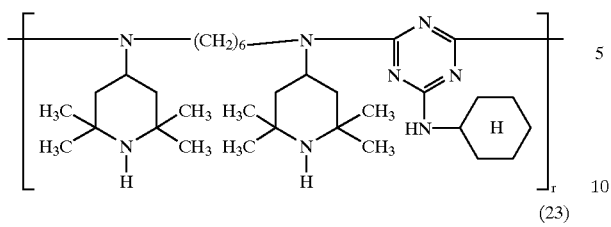
(22)

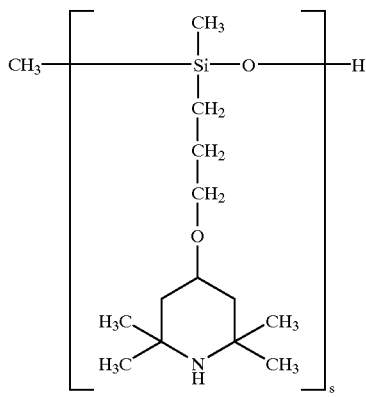
(23)

a product U5 obtainable by reacting a product of reaction of a polyamine of the formula U5a:

(U5a)

and cyanuric chloride with a compound of the formula (U5b)

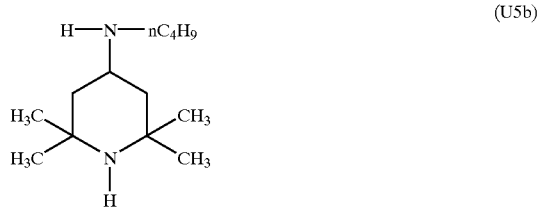
(U5b)

and at least one component of the above-described formulae (13) and (14).

The additives mixtures of the invention comprise
A) from 1 up to 48% by weight of peroxide-destroying phosphorus or sulfur compounds,
B) from 1 to 48% by weight of phenolic antioxidants,
C) from 98 to 4% by weight of sterically hindered amines, and
D) from 0 to 50% by weight of further additives.

Particular preference is given to additives mixtures comprising
A) from 10 to 40% by weight of peroxide-destroying phosphorus or sulfur compounds,
B) from 10 to 40% by weight of phenolic antioxidants,
C) from 80 to 20% by weight of sterically hindered amines, and if desired
D) from 0 to 50% by weight of further additives.

It is possible in addition to employ lubricants as described in Plastics Additives Handbook, edited by R. Gächter and H. Müller, Hansa Publishers Munich, 4th edition, 1993 in Section 6.4.2, examples being bisstearylethylenediamine or sodium alkanesulfonates having a chain length of $C_8$–$C_{20}$ or polyolefin waxes having a molecular weight of up to 10,000, preferably 50–8000.

The present invention additionally provides polyolefin molding compounds comprising
from 95.0 to 99.97% by weight of an olefin polymer,
from 0.03 to 5% by weight of the abovementioned additives mixture, and
from 0 to 5% by weight of further additives.

Preference is given to polyolefin molding compounds comprising
from 97.0 to 99.95% by weight of an olefin polymer,
from 0.05 to 3% by weight of the abovementioned additives mixture, and
from 0 to 3% by weight of further additives.

Very particular preference is given to polyolefin molding compounds in which the polymer is polyethylene, polypropylene, polyisobutylene, polybut-1-ene, polymethyl-1-pentene, polyisoprene, polybutadiene, an ethylene-propylene copolymer, a propylene-butadiene copolymer, an isobutylene-isoprene copolymer, an ethylene-alkyl acrylate copolymer, an ethylene-alkyl methacrylate copolymer, an ethylene-vinyl acetate copolymer or an ethylene-acrylic acid copolymer.

Suitable olefin polymers are described in German Patent Application No. 197 19944.5 on pages 44–46, the content of which is expressly incorporated here by reference.

Of the polymers mentioned, preference is given to employing homopolymers and copolymers of propylene and their mixtures with terpolymers of propylene, ethylene and a diene.

The polyolefin composition of the invention may additionally comprise further different conventional additives, as are described, for example, in German Patent Application No. 197 19944.5 on pages 51–65 in sections 1–15, the content of which is expressly incorporated here by reference.

Experiment Description

The polyolefin molding compounds of the invention are prepared by known methods. Their preparation can take place, for example, by mixing the stabilizers and any further additives by methods customary in the art in the course of polymerization of the monomers or prior to or during the shaping operation, or else by applying the dissolved or dispersed compounds to the polymer, with or without subsequent evaporation of the solvent. The stabilizers can also be added in the form of a masterbatch which can contain these products in a concentration of from about 2.5 to 25% by weight to the molding compound to be prepared. Their addition prior to a possible crosslinking operation is likewise possible. To produce calendered films, the molding compound of the invention is processed by the techniques customary for calendered PVC films. For this purpose it is first plasticated and homogenized using, for example, a roll mill or a kneading apparatus. It is then introduced into the nip between the first and second rolls of a film calender comprising from three to seven, usually four, rolls and is drawn out in the plastic state to form a film, which is cooled and wound up. The processing temperature is in general within the range from 170 to 250° C., or higher in exceptional cases, and depends on the melting characteristics of the base polymer.

EXAMPLE A TO P

Investigations into the processing behavior of the polypropylene molding compound in comparison with a calendered PVC film molding compound were conducted on a two-roll mill (steel rolls Ø 150 mm/temperature 190° C./friction 15/20 rpm) in the form of a dynamic stability test. This test method is used to assess the calenderability of PVC mixtures in particular. The PVC batch A was prepared by weighing out the ingredients, mixing them in a combined heating/cooling mixer with heating to 120° C, and then cooling the mixture to room temperature.

Before conducting the dynamic stability test, the polypropylene molding compounds of Table 1 were each premixed cold and the resulting mixtures were extruded from a single-screw extruder at a barrel temperature of 190° C./210° C./230° C./240° C. and then strand pelletized.

For each test, 200 g of each molding compound were introduced into a two-roll mill for the dynamic stability test. The test criterion employed for determining the timespan from the end of formation of the rolled hide to the point when the polymer melt sticks fast to the hot metal surfaces of the two-roll mill (tack-free time) was the instant at which the 1 mm thick hide can no longer be rolled up with the aid of a wooden spatula from the side to the center of the roll. Furthermore, after 30 minutes of rolling, a 30 g sample was taken for determination of the MFI. In some experiments, in addition, the MFI was determined after a running time of 5, 10 and 20 minutes.

The test results are compiled in Table 2. They show that, under identical test conditions, a conventionally stabilized polypropylene molding compound (C) sticks fast to the hot roll surfaces after just a short running time in comparison with a PVC molding compound for calendered films (A), and the polypropylene hide can no longer be removed from the rolls. Owing to the thermal stress, the polypropylene molding compound undergoes severe degradation and there is likewise a sharp decrease in its viscosity.

It can additionally be seen that, although the addition of various antioxidants and lubricants delays the onset of sticking of the polypropylene film to the hot metal surfaces of the two-roll mill, the required tack-free processing characteristics and considerable reduction in the degradation of the polymer chain cannot be achieved by means of these additions.

Only the use of the additives mixture of the invention brings about the desired release effect on the hot roll surfaces and preserves the high viscosity of the polymer melt that is required for processing on calendering units, i.e., leads to a reduced level of degradation of the polymer molecules.

TABLE 1

(all amounts in phr)

| Comp. | A | 100.0 | S-PVC, K value 60 |
|---|---|---|---|
| | | 1.5 | octyl-tin mercaptide |
| | | 0.5 | glycerol monoleate |
| | | 0.5 | ester of montanic acid with glycerol |
| | B | 100.0 | polypropylene (MFI 230/2.16 = 8.5 g/10 min) unstabilized |
| | C | 100.0 | polypropylene (MFI 230/2.16 = 6 g/10 min) commercial product with basic stabilization |
| | D | 100.0 | polypropylene blend commercial product with 20% chalk |
| | E | 100.0 | polypropylene |
| | | 0.8 | tetrakismethylene(3,5-di-tert-butyl-4-hydroxy-hydrocinnamato)methane |
| | | 0.8 | tris(2,4-di-tert-butylphenyl) phosphite |
| | | 0.55 | Ca stearate |
| | F | 100.0 | propylene |
| | | 0.2 | calcium stearate |
| | | 0.15 | bisstearylethylenediamine |
| | | 0.1 | tetrakismethylene(3,5-di-tert-butyl-4-hydroxy-hydrocinnamato)methane |
| | G | 100.0 | polypropylene |
| | | 0.2 | calcium stearate |
| | | 0.35 | bisstearylethylenediamine |
| | | 0.15 | bis)3,3-bis(4'-hydroxy-3'tert-butylphenyl)butanoic acid) glycol ester |
| | | 0.10 | tris(2,4-di-tert-butylphenyl) phosphite |
| | | 0.10 | distearyl 3,3'-thiodipropionate |
| | | 0.10 | octadecyl disulfide |
| | H | 100.0 | polypropylene |
| | | 0.2 | calcium stearate |
| | | 0.15 | bisstearlethylenediamine |
| | | 0.25 | mixture M |
| | I | 100.0 | polypropylene |
| | | 0.2 | calcium stearate |
| | | 0.15 | bisstearylethylenediamine |
| | | 0.10 | tetrakismethylene(3,5-di-tert-butyl-4-hydroxy-hydrocinnamato)methane |
| | | 0.10 | tris(2,4-di-tert-butylphenyl) phosphite |
| | | 0.25 | mixture M |
| | K | 100.0 | polypropylene |
| | | 0.2 | calcium stearate |
| | | 0.1 | tetrakismethylene(3,5-di-tert-butyl-4-hydroxy-hydrocinnamato)methane |
| | | 0.1 | tris(2,4-di-tert-butylphenyl) phosphite |
| | | 0.25 | mixture M |
| | L | 100.0 | polypropylene |
| | | 0.2 | calcium stearate |
| | | 0.1 | tetrakismethylene(3,5-di-tert-butyl-4-hydroxy-hydrocinnamato)methane |
| | | 0.1 | tris(2,4-di-tert-butylphenyl) phosphite |
| | | 0.25 | compound (21) |
| | | 0.15 | bisstearylethylenediamine |
| | M | 100.0 | polypropylene |
| | | 0.2 | calcium stearate |
| | | 0.1 | tetrakismethylene(3,5-di-tert-butyl-4-hydroxy-hydrocinnamato)methane |
| | | 0.1 | tris(2,4-di-tert-butylphenyl) phosphite |
| | | 0.25 | compound $U_X$ |
| | | 0.15 | bisstearylethylenediamine |
| | N | 100.0 | polypropylene |
| | | 0.2 | calcium stearate |
| | | 0.1 | tetrakismethylene(3,5-di-tert-butyl-4-hydroxy-hydrocinnamato)methane |
| | | 0.1 | tris(2,4-di-tert-butylphenyl) phosphite |
| | | 0.25 | bis(2,2,6,6-tetramethylpiperdin-4-yl) sebacate |
| | | 0.15 | bisstearylethylenediamine |
| | O | 100.0 | polypropylene |
| | | 0.2 | calcium stearate |
| | | 0.1 | tetrakismethylene(3,5-di-tert-butyl-4-hydroxy-hydrocinnamato)methane |
| | | 0.1 | tris(2,4-di-tert-butylphenyl) phosphite |
| | | 0.25 | 2,2,4,4-tetramethyl-7-oxa-21-oxo-3,20-diazadispiro-[5.1.11.2]heneicosane-3-propanoic acid dodecyl ester and 2,2,4,4-tetramethyl-7-oxa-21-oxo-3,20-diazadispiro-[5.1.11.2]heneicosane-3-propanoic acid tetradecyl ester |
| | | 0.15 | bisstearylethylenediamine |
| | P | 100.0 | polypropylene |
| | | 0.2 | calcium stearate |
| | | 0.08 | tetrakismethylene(3,5-di-tert-butyl-4-hydroxy-hydrocinnamato)methane |
| | | 0.1 | tetrakis(di-tert-butyl)diphenylidene diphosphite (formula 7) |
| | | 0.25 | 2,2,4,4-tetramethyl-7-oxa-21-oxo-3,20-diazadispiro-[5.1.11.2]heneicosane-3-propanoic acid dodecyl ester and 2,2,4,4-tetramethyl-7-oxa-21-oxo-3,20-diazadispiro-[5.1.11.2]heneicosane-3-propanoic acid tetradecyl ester |
| | | 0.15 | bisstearylethylenediamine |

TABLE 2

Dynamic stability test on a two-roll mill at 190° C. and 15/20 rpm

| Mixture | Tack-free time (min) |
|---|---|
| A | 45 |
| B | <1 |
| C | <1 |
| D | 12 |
| E | 25 |
| F | 45 |
| G | 125 |
| H | <1 |
| I | >180 |
| K | >180 |
| L | >180 |
| M | >180 |
| N | >180 |
| O | >180 |
| P | >180 |

As shown by Example I–P it is possible, using the combinations described, to achieve excellent processing stabilities which are manifested in long tack-free times.

What is claimed is:

1. A process for producing calendered films from olefin polymers, the process comprising:

a) producing an additives mixture, wherein the additives mixture comprises:

A) at least one compound selected from the group of peroxide-destroying phosphorus or sulfur compounds of formulae (1) to (5)

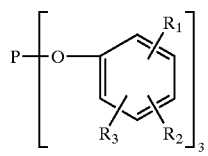
(1)

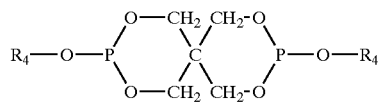
(2)

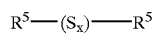
(3)

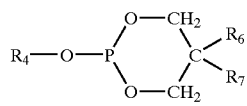
(4)

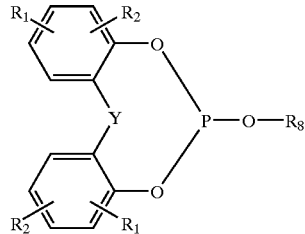
(5)

in which $R^1$, $R^2$ and $R^3$ are identical or different and are a hydrogen atom, a methyl group, a t-butyl group, a 1,1-dimethylpropyl group or a cyclohexyl group or are a phenyl radical which is unsubstituted or substituted by $R^1$ to $R^3$ as defined above but excluding a further phenyl radical, $R^4$ is a $C_8$–$C_{22}$-alkyl group or a radical of formula (6)

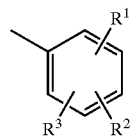
(6)

in which $R^1$ to $R^3$ are as defined above or are 2-phenyl-2,2-dimethylethyl groups, $R^5$ is a $C_8$–$C_{20}$-alkyl group and x is an integer from 1 to 5, or $R^5$ is $C_8$–$C_{20}$—O(O)C—CH$_2$—CH$_2$—, $R^6$ and $R^7$ are identical or different and are a hydrogen atom, a methyl group, an ethyl group, a n-butyl group, a t-butyl group or a propyl group, $R^8$ is a halogen atom, a branched or unbranched $C_1$–$C_{10}$-alkyl group, or a trivalent group of formula

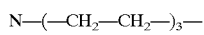

in which each valence is occupied by formula (5) to give structure N-[CH$_2$—CH$_2$—O—P-radical of formula (5)]$_3$;

Y is a direct bond, a methylene group or an alkyl-substituted alkylene bridge having a total of 4 carbon atoms;

a compound of formula (7)

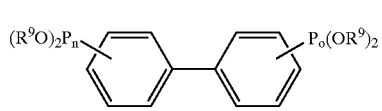
(7)

where the sum of n and o is 1 or 2 and $R^9$ is a radical of the formula (6), and B) at least one compound selected from the group of phenolic antioxidants, wherein the phenolic antioxidants consist of 3,3-bis(3'-tert-butyl-4'-hydroxyphenyl) butyric acid glycol ester, tetrakismethylene(3,5-di-tert-butyl-4-hydroxycinnamato)-methane, octadecyl 3,5-di-tert-butyl-4-hydroxycinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,4,6-tris(3,5-di-tert-butyl-4-hydroxybenzyl) isocyanurate, 1,1,3-tris(2'-methyl-4'-hydroxy-5'-tert-butylphenyl)butane, 3,9-bis[1,1-dimethyl-2-(di-tert-butyl-4-hydroxy-5-methylphenyl)propionyloxy)ethyl]-2,4,8,10-tetraoxospiro[5.5]undecane, α-tocopherol including its isomer mixture and of formula (8)

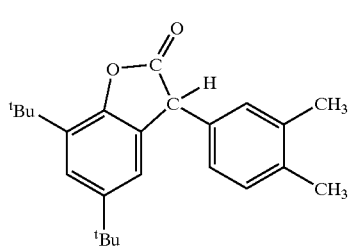
(8)

and

C) at least one compound selected from the group of sterically hindered amines, wherein the sterically hindered amines consist of compound (9)

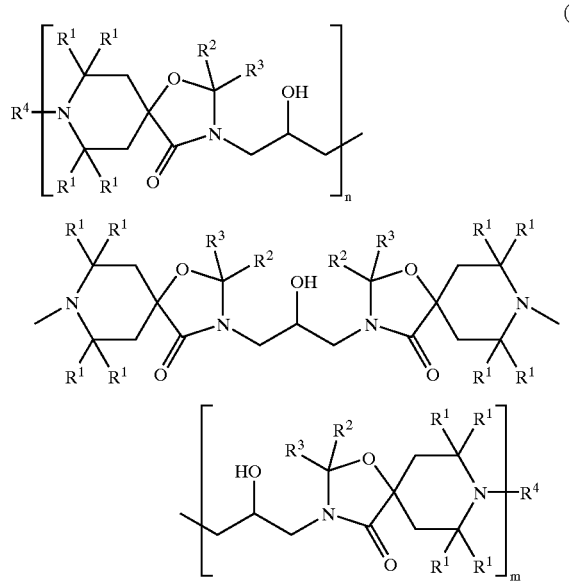

(9)

in which n and m independently of one another are a number from 0 to 100, where n and m cannot simultaneously be 0, $R^1$ is hydrogen or a $C_1$–$C_{12}$-alkyl group, $R^2$ and $R^3$, independently of one another, are a hydrogen atom or a $C_1$–$C_{18}$-alkyl group or, together with the carbon atom connecting them, are a ring of ring size 5 to 13 or, together with the carbon atom linking them, are a group of formula (10)

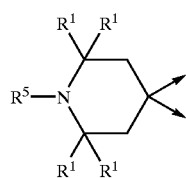

(10)

$R^4$ in the formula (9) and $R^5$ in the formula (10), independently of one another, are either hydrogen or a $C_1$–$C_{22}$-alkyl group, an oxygen radical O*, —OH, —NO, —CH$_2$CN, benzyl, allyl, a $C_1$–$C_{30}$-alkyloxy group, a $C_5$–$C_{12}$-cycloalkyloxy group, or a $C_6$–$C_{10}$-aryloxy group, where the aryl radical can additionally also be substituted; a $C_7$–$C_{20}$-arylalkyloxy group where the aryl radical can additionally also be substituted, a $C_3$–$C_{10}$-alkenyl group, a $C_3$–$C_6$-alkynyl group, a $C_1$–$C_{10}$-acyl group, halogen, or $C_7$–$C_9$-phenylalkyl which is unsubstituted or substituted on the phenyl ring by $C_1$–$C_4$-alkyl;

a compound (11)

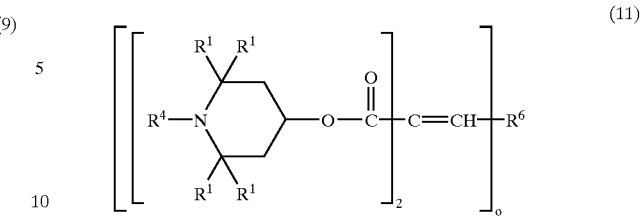

(11)

in which $R^1$ and $R^4$ are as defined for the formula (9), $R^6$ is an unsubstituted or substituted aromatic radical and o is 1 or 2;

a compound (12)

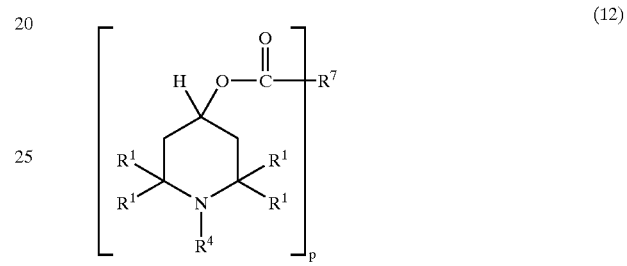

(12)

in which $R^1$ and $R^4$ are as defined for the formula (9), $R^7$ is $C_1$–$C_{18}$-alkylene, $C_2$–$C_{18}$-oxaalkylene, $C_2$–$C_{18}$-thiaalkylene, $C_2$–$C_{18}$-azaalkyle or $C_2$–$C_8$-alkenylene; a $C_1$–$C_{18}$ n-valent aliphatic radical; $R^3$ as $C_1$–$C_{18}$-alkylene is branched or especially straight-chain alkylene, p is a number 1 to 10;

the compounds:

5,11-bis(2,2,6,6-tetramethyl-4-piperidinyl)-3,5,7,9,11,13-hexaaza-tetracyclo[7.4.0.0$^{2,7}$0.1$^{3,13}$]tetradecane-8,14-dione; 2,2,4,4-tetramethyl-20-(oxiranylmethyl)-7-oxa-3,20-diazadispiro[5.1.11.2]heneicosan-21-one; 2,2,4,4-tetramethyl-7-oxa-21-oxo-3,20-diaza-dispiro[5.1.11.2]heneicosane-3-propanoic acid dodecyl ester and 2,2,4,4-tetramethyl-7-oxa-21-oxo-3,20-diazadispiro[5.1.11.2]heneicosane-3-propanoic acid tetradecyl ester;

at least one compound of formulae (13) and (14)

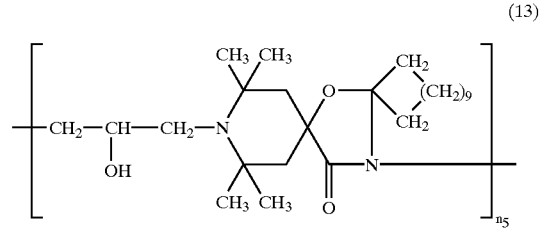

(13)

-continued (14)

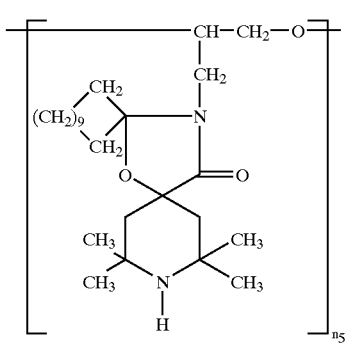

in which $n_5$ independently is an integer of 2 to 30;
the reaction product U1 of epichlorohydrin and 2,2,4,4-tetramethyl-20-(oxiranylmethyl)-7-oxa-3,20-diazadispiro[5.1.11.2]heneicosan-21-one;
a mixture M comprising the compound (9) in a proportion of 60 to 95% by weight, a compound (15) in a proportion of 4 to 30% by weight and a compound (16) in a proportion of 1 to 10% by weight (15)

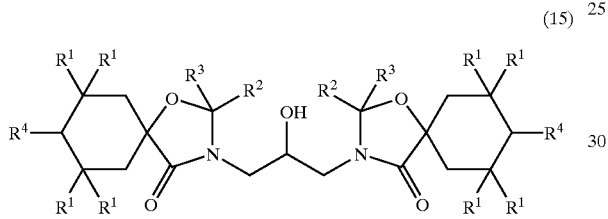

(16)

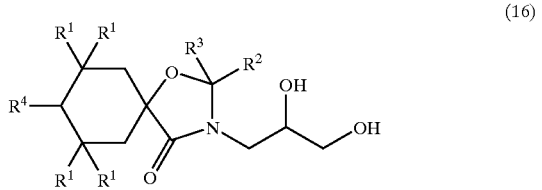

in which the substituents are as defined for the compound of the formula (9),
a compound U2 which represents a condensation product of 1-hydroxyethyl-2,2,6,6-tetramethyl-4-hydroxypiperidine and succinic acid;
a product U3 obtainable by reacting a reaction product of a polyamine of formula U3b and cyanuric chloride with a compound of formula U3b, (U3a)

$H_2N\text{---}(CH_2)_{\overline{n_{5'}}}\text{---}NH\text{---}(CH_2)_{\overline{n_{5''}}}\text{---}NH\text{---}(CH_2)_{\overline{n_{5'''}}}\text{---}NH_2$ (U3b)

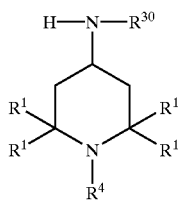

where
  $R^1$ and $R^4$ are as defined for the formula (9),
  $n_{5'}$, $n_{5''}$, and $n_{5'''}$, independently of one another, are a number from 2 to 12, $R^{30}$ is hydrogen, $C_1$–$C_{12}$-alkyl, $C_5$–$C_{12}$-cycloalkyl, phenyl or $C_7$–$C_9$-phenylalkyl;
where U3 is a compound of formula U3-1, U3-2, U3-3

(U3-1)

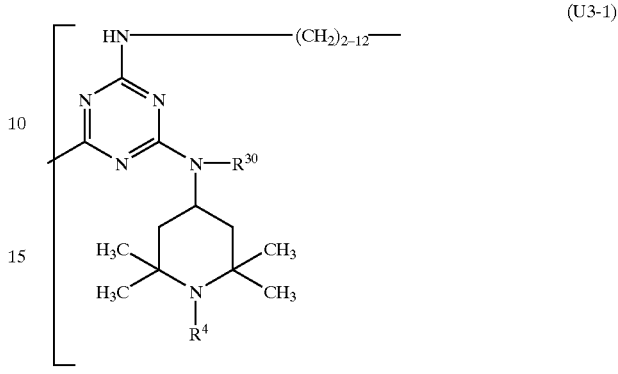

(U3-2)

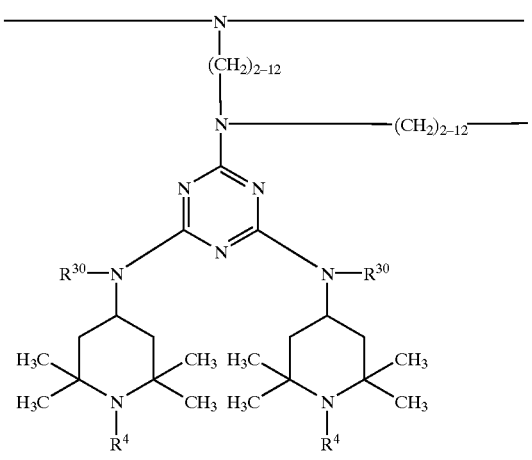
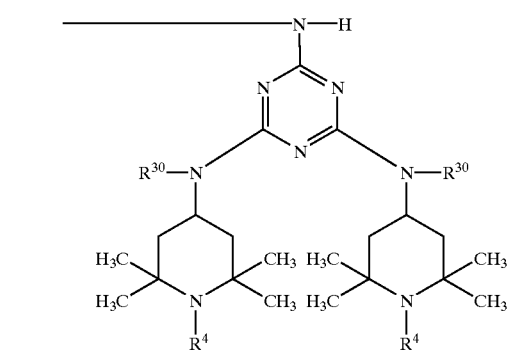
(U3-3)
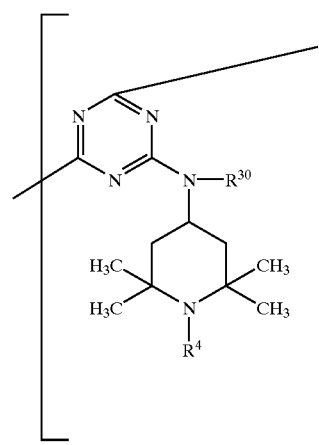
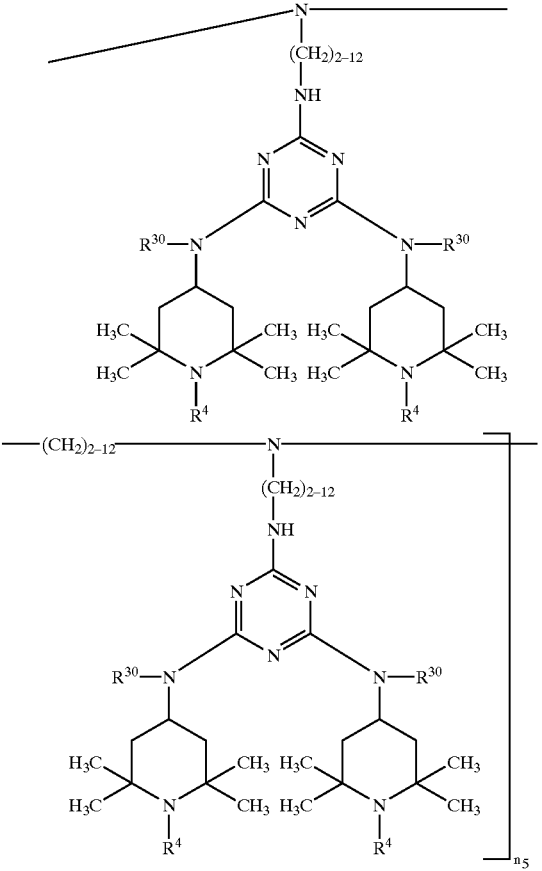
or a mixture thereof, in which
$n_5$ is a number from 1 to 20,
$R^4$ and $R^{30}$ are as defined for compound (9) or, respectively, for compound U3b;
a compound (17)
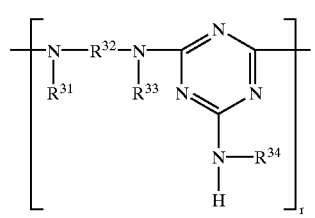
(17)
where
r is a number from 2 to 50,
$R^{31}$, $R^{33}$ and $R^{34}$ independently of one another are hydrogen, $C_1$–$C_{12}$-alkyl, $C_5$–$C_{12}$-cycloalkyl, $C_1$–$C_4$- alkyl-substituted $C_5$–$C_{12}$-cycloalkyl, phenyl, —OH— and/or $C_1$–$C_{10}$-alkyl-substituted phenyl, $C_7$–$C_9$-phenylalkyl, $C_7$–$C_9$-phenylalkyl which is substituted on the phenyl radical by —OH and/or $C_1$–$C_{10}$-alkyl, or are a group of formula 17a,

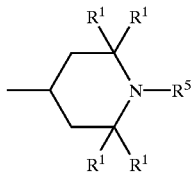

(17a)

where $R^1$ and $R^5$ are as defined in compound (9) or, respectively, compound (10) and $R^{31}$ and $R^{33}$ additionally and independently of one another are hydrogen, $R^{32}$ is $C_2$–$C_{18}$-alkylene, $C_5$–$C_7$-cycloalkylene or $C_1$–$C_4$-alkylenedi($C_5$–$C_7$-cycloalkylene) or the radicals $R^{31}$, $R^{32}$ and $R^{33}$, together with the nitrogen atoms to which they are attached, form a 5- to 10-membered heterocyclic ring, and where at least one of the radicals $R^{31}$, $R^{33}$ and $R^{34}$ is a group of the formula 17a;

a compound (18)

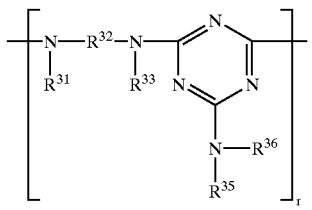

(18)

in which $R^{31}$, $R^{32}$, $R^{33}$ and r are as defined above, $R^{35}$ and $R^{36}$, independently of one another, are defined as $R^{34}$, or $R^{35}$ and $R^{36}$, together with the nitrogen atom to which they are attached, form a 5- to 10-membered heterocyclic ring which in addition to the nitrogen heteroatom may also include one or more heteroatoms and at least one of the radicals $R^{31}$, $R^{33}$, $R^{35}$ and/or $R^{36}$ is a group of the formula (17a);

a compound (19)

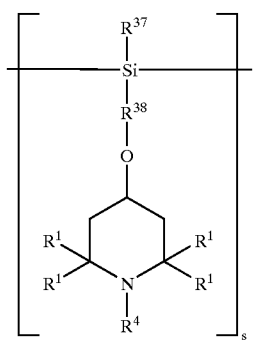

(19)

where $R^1$ and $R^4$ are as defined for compound (9) and s is a number from 1 to 50, $R^{37}$ is $C_1$–$C_{10}$-alkyl, $C_5$–$C_{12}$-cycloalkyl, $C_1$–$C_4$-alkyl-substituted $C_5$–$C_{12}$-cycloalkyl, phenyl or $C_1$–$C_{10}$-alkyl-substituted phenyl, $R^{38}$ is $C_3$–$C_{10}$-alkylene;

a product U4 obtainable by reacting a polyamine of the formula U3a with formula U4a

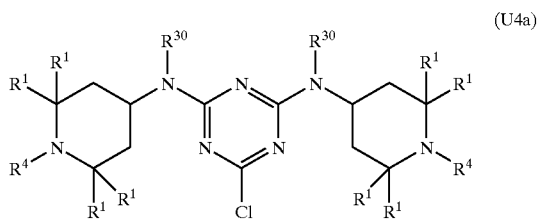

(U4a)

where the radicals $R^1$, $R^4$ and $R^{30}$ are as defined for compound (9) or, respectively, compound U3b;

b) producing a polyolefin molding compound comprising from 95.0 to 99.97% by weight of an olefin polymer, from 0.03 to 5% by weight of said additives mixture, and from 0 to 5% by weight of further additives, and c) plasticating the polyolefin molding compound and drawing the polyolefin molding compound out in the plastic state on a film calender.

2. The process as claimed in claim 1, wherein the additives mixture comprises

A) at least one compound of the group:

tris(2,4-di-tert-butylphenyl)phosphite, distearyl pentaerythritol diphosphite, bis(2,4-di-tert-butylphenyl) pentaerythritol diphosphite, 1,3,2-dioxaphosphorinan-5-butyl-5-ethyl-2-[2,4,6-tri-tert-butylphenoxy],2,2',2"-nitrilo[triethyl tris(3,3',5,5'-tetra-tert-butyl-1,1'-biphenyl-2,2'-diyl)phosphite], tetrakis(2,4-di-tert-butyl)-4,4'-diphenylidene diphosphite, and its positional isomers or a mixture thereof, and bis(2,4-dicumylphenyl)pentaerythritol diphosphite;

B) at least one compound of the group:

3,3-bis(3'-tert-butyl-4'-hydroxyphenyl)butyric acid glycol ester, tetrakismethylene(3,5-di-tert-butyl-4-hydroxycinnamato)methane, octadecyl 3,5-di-tert-butyl4-hydroxycinnamate, α-tocopherol and the mixture of its isomers, 1,3,5-trimethyl-2,4,6-tris(3,5-di-tert-butyl4-hydroxybenzyl)benzene, 1,3,5-tris(3,5-di-tert-butyl-4-hydroxybenzyl)isocyanurate, 2,4,6-tris(3, 5-di-tert-butyl-4-hydroxybenzyl)isocyanurate or a compound of the formula (8);

C) at least one compound of the group:

the mixture M, 2,2,4,4-tetramethyl-20-(oxiranylmethyl)-7-oxa-3,20-diazadispiro[5.1.11.2]heneicosan-21-one, 2,2,4,4-tetramethyl-7-oxa-21-oxo-3,20-diazadispiro[5.1.11.2]heneicosane-3-propanoic acid dodecyl ester and 2,2,4,4-tetramethyl-7-oxa-21-oxo-3,20-diazadispiro[5.1.11.2]heneicosane-3-propanoic acid tetradecyl ester, bis(2,2,6,6-tetramethylpiperidin-4-yl) sebacate, [(4-methoxyphenyl)methylene]propanedioic acid bis(2,2,6,6-tetramethyl-4-piperidinyl)ester, bis(1-octyloxy-2,2,6,6-tetramethylpiperidyl)sebacate, N,N'-diformyl-N,N'-bis(2,2,6,6-tetramethyl-4-piperidinyl) hexamethylenediamine, the reaction product U1 of epichlorohydrin, the compounds of the formulae (9), (13) and (14), a compound (19)

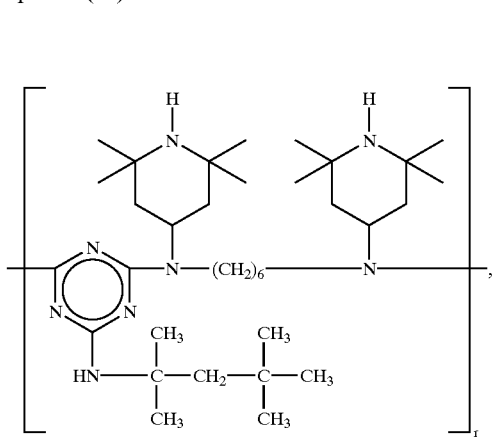

the reaction products $U_x$ of 2-chloro-4,6-di(4-n-butylamino-1,2,2,6,6-penta-methylpiperidyl)-1,3,5-triazine with monovalent or polyvalent amines, where between one and all active hydrogen atoms on the amine are replaced, such as with ethylenediamine, diethylenetriamine, triethylenetetramine, hexamethylenediamine, 1,2-bis(3-aminopropylamino)ethane, the compounds of formulae (20) to (23)

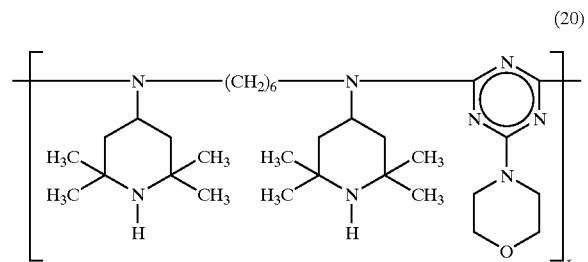

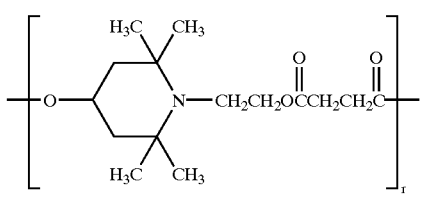

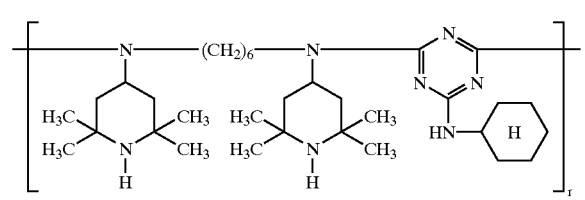

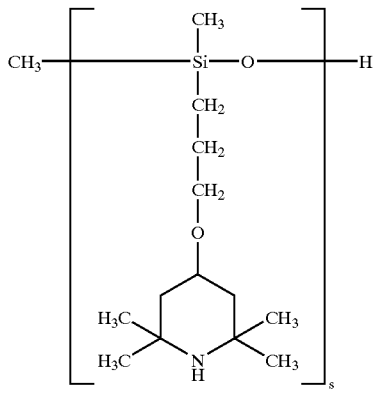

a product U5 obtainable by reacting a product of reaction of a polyamine of formula U5a:

and cyanuric chloride with a compound of formula (U5b)

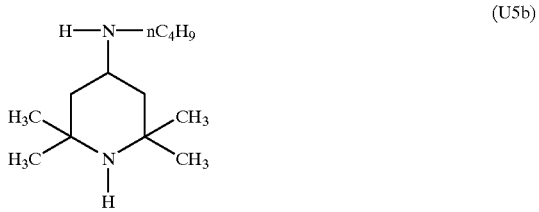

and at least one compound of the formulae (13) and (14).

3. The process as claimed in claim 1, wherein the additives mixture comprises
 A) from 1 to 48% by weight of peroxide-destroying phosphorus or sulfur compounds,
 B) from 1 to 48% by weight of phenolic antioxidants,
 C) from 98 to 4% by weight of sterically hindered amines, and optionally
 D) from 0 to 50% by weight of further additives.

4. The process as claimed in claim 1, wherein the additives mixture comprises
 A) from 10 to 40% by weight of peroxide-destroying phosphorus or sulfur compounds,
 B) from 10 to 40% by weight of phenolic antioxidants,
 C) from 80 to 20% by weight of sterically hindered amines, and optionally
 D) from 0 to 50% by weight of further additives.

5. The process as claimed in claim 1, wherein the polyolefin molding compound comprises
 from 97.0 to 99.95% by weight of an olefin polymer,
 from 0.05 to 3% by weight of the additives mixture, and
 from 0 to 3% by weight of further additives.

6. The process as claimed in claim 5, wherein the olefin polymer is polyethylene, polypropylene, polyisobutylene, polybut-1-ene, polymethyl-1-pentene, polyisoprene, polybutadiene, an ethylene-propylene copolymer, a propylene-butadiene copolymer, an isobutylene-isoprene copolymer, an ethylene-alkyl acrylate copolymer, an ethylene-alkyl methacrylate copolymer, an ethylene-vinyl acetate copolymer or an ethylene-acrylic acid copolymer.

7. The process as claimed in claim 1, wherein the additives mixture further comprises a stearate Z of an alkaline earth metal.

8. The process as claimed in claim 1, wherein the heteroatom in $R^{35}$ and $R^{36}$ of compound (18) is an oxygen atom.

9. The process as claimed in claim 1, wherein the olefin polymer is a homopolymer or a copolymer of propylene or polyethylene.

* * * * *